United States Patent Office 3,557,242
Patented Jan. 19, 1971

3,557,242
DIMERISATION OF OLEFINES
Roy John Sampson and John Melvyn Thomas, Norton-on-Tees, England, assignors to Imperial Chemical Industries Limited, London, England, a corporation of Great Britain
No Drawing. Filed Mar. 3, 1969, Ser. No. 804,021
Claims priority, application Great Britain, Mar. 4, 1968, 10,290/68
Int. Cl. C07c 3/20
U.S. Cl. 260—683.15                                     3 Claims

ABSTRACT OF THE DISCLOSURE

A process for dimerising or codimerising an olefine or olefine mixture using a silica-alumina catalyst incorporating nickel oxide or a nickel salt, wherein the proportion of alumina in the catalyst is within the range of from 0.1 to 10% by weight.

---

This invention relates to the dimerisation and codimerisation of olefines.

It is already known that olefines containing up to say 5 to 8 carbon atoms may be dimerised in the presence of catalysts containing nickel oxide on supports of silica incorporating a proportion of alumina. Valuable higher molecular weight olefine products are obtained which severally find special use as precursors of plasticizer alcohols and detergent materials.

The literature has revealed wide range of permitted alumina contacts, commonly up to 50% by weight. The catalysts may be prepared by a number of well-known methods, of which the following are preferred viz: impregnation of a preformed support, e.g. a synthetic silica alumina, with an aqueous solution of a nickel salt, especially nickel nitrate; impregnation of silica gel with aqueous solutions of nickel and aluminium salts; coprecipitation of a silica-alumina-nickel oxide composite. The catalysts are activated by calcination.

The performance of dimerisation catalysts is judged by a consideration of the olefine conversions achieved under desired general process conditions of temperature and pressure and solvent media (if any), the yields of desired dimer and codimer products obtained at those conversions, as well as of the intrinsic activity of the catalysts as measured by the rate at which given conversions are achieved and their useful lifetimes. For both continuous processes (in which there is supply of reactant or reactants and withdrawal of products throughout the process) and batch processes (in which the total quantity of material to be reacted is fed to a reactor vessel at the onset of the process and products are withdrawn at the termination of the process) high yields of desired products and moderate or fast reaction rates are normally sought for, but very high conversions at the expense of best yields will not ordinarily be desired especially where the reactants are expensive, or where separation and re-use or recycle of unreacted starting materials can be relatively easily achieved. Clearly, however, discoveries of new processes whereby higher yields of desired dimers or codimers at similar conversions or whereby similar yields of desired dimers or codimers at higher conversions are obtainable, while maintaining in either case an acceptable reaction rate, will be important.

The applicants have studied the performance for olefine dimerisation and codimerisation of nickel-containing silica-alumina catalysts, which have been formed by the aforedescribed methods and have shown that especially valuable catalysts are obtained when the proportions of catalyst ingredients are within selected ranges. Thus the content of alumina should be within the range of from 0.1 to 10% by weight with proportions within the range of from around 0.4 or 0.5 to 5% by weight alumina being especially preferred. The catalysts may contain magnesia in a proportion up to 10% by weight although proportions of magnesia not exceeding 5% by weight are preferred.

The content of nickel, as oxide or salt e.g. the sulphate or halide such as chloride may suitably be within the range of from 2 to 12% by weight (calculated as metal) with proportions within the range of from 6 to 12% by weight being favoured as they give rise to higher activities. The nickel content may exceed 12% by weight but usually no advantage results.

Catalysts having constituents within the selected ranges aforespecified have good activities and enable olefines such as propylene and n-butenes to be dimerised and codimerised in high yields at given conversion levels.

Increasing the alumina content of the catalysts over the given ranges leads to an increase in catalyst activity but the yields of dimer or codimer at given conversions decrease. In the case of catalysts whose alumina content has been introduced by impregnation of a silica support material, it is best to use contents of alumina within the ranges 0.1 to 2%, say, 0.1 to 1%, by weight. It has also been found that the presence of sulphate anions and halide anions (introduced, for example, by utilising nickel sulphate or chloride in catalyst preparation), is beneficial, giving rise to increased activity. This is especially important when alumina contents towards the lower end of the given ranges are desired. The presence of these anions permits high activities to be obtained without resorting to alumina contents at which some loss of selectivity is inevitable.

The content of alkali metal oxide in the catalysts should be as low as possible for dimerisation and codimerisation involving normal olefins such as propylene and n-butenes.

The presence of alkali metal oxide causes a significant reduction in catalyst activity. The applicants have, however, discovered that the presence of a small proportion of alkali metal oxide is very advantageous when codimerising a mixture of olefins including a branched olefine, especially isobutene. Especially preferred are coprecipitated catalysts containing a small proportion of alkali metal oxide. Representative olefine mixtures are a mixture of propylene and isobutene, a mixture of n-butenes and isobutene and a mixture of propylene and n- and iso-butenes. The optimum quantity of alkali metal oxide (e.g. sodium oxide) will depend upon the proportion of alumina present. Broadly, advantageous catalysts for codimerisations involving branched olefines such as isobutene contain from about 0.4 or 0.5 to 4% alumina and from 0.05 to 0.8% alkali metal oxide (calculated as metal), lower contents of alumina being associated with lower contents of alkali metal oxide. Where alumina is introduced by impregnating a silica substrate the alumina content preferably does not exceed 3% by weight. Thus catalysts containing up to an optimum of 2% by weight of alumina may suitably contain up to 0.2% by weight (the optimum for 2% by weight alumina) of alkali metal oxide (calculated as metal) and catalysts containing from 2 to 4% alumina may suitably contain from 0.2 to 0.8% alkali metal (calculated as metal). The contents of nickel oxide or salt (e.g. sulphate) and magnesia, when present, may be as already described. The incorporation of alkali metal oxide results in catalysts having similar or more nearly similar activities towards linear olefines, such as propylene and n-butenes, and branched olefines, such as isobutene. In the absence of alkali metal oxide, the catalysts exhibit relatively very marked activities towards branched olefines such as isobutene. In the presence of alkali metal oxide in the proportions described, acceptable convension of each component of the mixture of linear and branched olefines may be achieved, especialy in the case of coprecipitated catalysts, so avoiding the need to use a substantial excess of the less reactive component or components and low pass-conversions with extensive recycle. A particularly useful application of these catalysts incorporating alkali metal oxide (usually sodium oxide) is in the codimerisation of propylene with mixed butenes obtained from a $C_4$ stream from pyrolysis operations after butadiene has been removed. $C_6$ to $C_8$ olefine mixture can be obtained with dimers and codimers in high yield with high space velocities and high conversions.

If it is desired to adjust the alkali metal oxide content this may be achieved for coprecipitated catalysts by washing at the undried gel state or after the gel has been dried, or by impregnating the dried gel.

In the preparation of coprecipitated catalysts, suitable amounts of the necessary ingredients as, say nitrates, aluminates, and silicates may be brought into solution and precipitated by addition of, for example, ammonia, ammonium carbonate, or sodium carbonate. The relative proportions of the several ingredients that are required in solution for given relative proportions in the precipitated catalyst precursor can be discovered by trial. Adjustment of the relative contents in the precipitated catalyst precursor may be achieved either by using different contents of the ingredients in solution or by, in suitable cases, impregnation, elution or ion-exchange techniques.

The catalyst may be used in the form of powder or aggregates such as pellets or extrusions. It may be employed in fixed bed, fluidised bed or slurry operations, fixed bed and especially, slurry operations being preferred. The catalysts may be regenerated by contacting with oxygen-containing gas at elevated temperatures. The dimerisation process may be operated batchwise or continuously, using olefines in the gaseous or liquid phases. The olefine or olefines being dimerised, or olefines which are products of the reaction, may provide the liquid phase. Alternatively a solvent such as a paraffinic hydrocarbon may be used which does not deactivate the catalyst or otherwise interfere with the dimerisation process. Pressure may be applied to maintain a liquid phase. The temperature at which the dimerisation process is carried out is suitably in the range 0° to 120° C. preferably 30° to 80° C. A convenient temperature for batch operations involving liquid olefine at autogenous pressure is around 60° C.

The pore volumes and surface areas of the catalysts may suitably be, for example, within the ranges 0.50 to 0.80 cc./g. and 450 to 600 m.$^2$/g. respectively.

The following examples illustrate the invention. They are representative of the many results obtained demonstrating the trends aforediscussed.

EXAMPLE 1

(A) Catalysts prepared by coprecipitation

Unless stated to the contrary, these catalysts were made by precipitating, with aqueous ammonia, an aqueous solution of nitric acid, nickel nitrate, magnesium nitrate (for MgO containing catalysts) sodium aluminate and sodium silicate. The precipitates were washed by reslurrying and dried at 110°. Powdered samples of the catalysts were activated by heating at 500° for 3 hours in dry air. Each catalyst (2.7 g.) was slurried with liquid propylene (200 ml.) in an autoclave at 60° C. at autogenous pressure.

| Run No. | Composition of catalyst percent by wt.[1] | | | | Duration of dimerisation (hours) | Percent conversion of propylene | Percent yield of hexenes | Notes on catalyst |
|---|---|---|---|---|---|---|---|---|
| | $NiO_2$ | $Al_2O_3$ | MgO | $Na_2O_3$ | | | | |
| 1 | 2.8 | 5.0 | 0.5 | 0.08 | 1 | 25.4 | 90 | |
| 2 | 6.5 | 0.8 | 5.5 | 0.43 | 1 | 24.2 | 89 | |
| 3 | 9.1 | 1.0 | 4.0 | 0.27 | 1 | 27.5 | 90 | |
| 4 | 9.6 | 1.8 | 3.1 | 0.19 | 1 | 36.9 | 86 | |
| 5+ | 6.2 | 40.0 | Nil | 0.55 | 1 | 32.7 | 64 | |
| 6+ | 5.8 | 12.7 | Nil | 0.34 | 0.5 | 39.1 | 79 | |
| 7 | 6.8 | 8.3 | Nil | 0.27 | 0.5 | 41.1 | 82 | |
| 8 | 7.8 | <0.1 | Nil | 0.06 | 16 | 33.2 | 88 | (4) |
| 9 | 1.1 | 1.8 | Nil | 0.28 | 20.5 | 30.6 | 90 | |
| 10 | 9.4 | 1.3 | 5.5 | 0.07 | 0.5 | 35.6 | 86 | (5) |
| 11 | 4.8 | 2.2 | 0.6 | 0.18 | 1 | 25.2 | 87 | (6) |
| 12 | 10.0 | 1.0 | 2.2 | 0.3 | 1 | 39.9 | 85 | (7) |
| 13 | 7.2 | <0.2 | 0.5 | 0.1 | 0.5 | 33.6 | 86 | (8) |
| 14 | 10.2 | 0.9 | 2.8 | 0.75 | 2 | 6.7 | 94 | (9) |

[1] Remainder of catalyst was $SiO_2$.
[2] Expressed as Ni.
[3] Expressed as Na.
[4] Catalyst was made from solutions of high purity potassium silicate, nickel nitrate, nitric acid and ammonia only.
[5] Precipitate dried before washing.
[6] Precipitated with ammonium carbonate solution.
[7] Precipitated with sodium carbonate solution.
[8] Nickel and magnesium chloride solutions used. Catalyst contained a residual proportion of chloride after calcining.
[9] Elution of alkali to (a) 0.14% and (b) 0.04% gave in 1 hour conversions of (a) 23% and (b) 51% with yields of (a) 91% and (b) 85%.
+ Comparison runs indicating effect of increased alumina content.

The relatively poor activity of the catalyst used in run 9 is due to the proportions of all ingredients being in the less preferred parts of the allowed ranges.

(B) Catalysts prepared by impregnation

Unless otherwise stated, these catalysts were prepared by impregnation of the support with aqueous nickel nitrate solution. They were used, in powder form to dimerise propylene as in (A) above.

| Run No. | Composition of catalyst percent by wt.[1] | | | | Duration of dimerisation (hours) | Percent conversion of propylene | Percent yield of hexenes | Notes on catalyst |
|---|---|---|---|---|---|---|---|---|
| | NiO$_2$ | Al$_2$O$_3$ | MgO | Na$_2$O$_3$ | | | | |
| 15 | 7.3 | 1.0 | 6.0 | 0.03 | 1 | 20.3 | 94 | (1) |
| 16 | 3.6 | 0.5 | Nil | Very low | 16.5 | 80 | 90 | (2) |
| 17 | 6.6 | Low | Nil | ≯0.04 | 2 | 54 | 91 | (3) |
| 18 | 7.8 | 1.0 | Nil | ≯0.04 | 16 | 52 | 87 | (4) |
| 19 | 7.6 | 2.3 | Nil | ≯0.04 | 1 | 53 | 81 | (5) |
| 20 | 7.0 | 0.4 | Nil | ≯0.04 | 1 | 47 | 90 | (6) |
| 21 | 6.6 | 0.3 | Nil | ≯0.04 | 16.5 | 3 | ‑‑‑‑‑ | (7) |
| 22+ | 3 | 24 | Nil | Very low | 1 | 34 | 71 | (8) |
| 23+ | 6.4 | 23 | Nil | Very low | 1 | 51 | 75 | (9) |

[1] Support was SiO$_2$/MgO/Al$_2$O$_3$/Na$_2$O.
[2] Prepared by impregnating a commercial silica gel drying agent with NiSO$_4$.
[3] Prepared by impregnating a commercial silica gel with NiSO$_4$. The SO$_4$ content was 9.3%.
[4] Prepared by impregnating the support of Example 17 with Ni(NO$_3$)$_2$ and Al(NO$_3$)$_3$.
[5] As run 18, using more Al(NO$_3$)$_3$.
[6] Prepared by impregnating the support of run 17, using NiSO$_4$ and Al$_2$(SO$_4$)$_3$.
[7] Prepared by impregnating the support of run 17 with Ni(NO$_3$)$_2$.
[8] Prepared by impregnating a silica alumina support with aqueous Ni(NO$_3$)$_2$.
[9] Prepared by impregnating a silica alumina support with aqueous Ni(NO$_3$)$_2$.
+ These runs are comparison runs showing inferior yields at comparable conversions and activities for higher alumina contents.

EXAMPLE 2

Four catalysts comprising nickel oxide on a support consisting of silica and alumina and/or magnesia were tested in the codimerisation of propylene, butene-2 and isobutene by contacting 200 ml. of a liquid mixture of 47% by weight of propylene, 28% by weight of isobutene and 25% by weight of butene-2 (equal proportions cis- and trans-butene-2) in an autoclave with 2.6 grams of each catalyst in powder form at 60° C.

The catalysts were made by coprecipitating nickel oxide and the other oxides. The catalysts were dried and calcined and before use each catalyst was activated by heating in dry air at 500° C. for 3 hours.

The catalyst of run 1 is included for comparison. The composition of catalysts and the results obtained are given in the following table:

| Run No. | Composition of catalyst* percent by weight | | | Percent Conversion of olefine | Percent yield of dimer |
|---|---|---|---|---|---|
| | Percent Ni | Percent Al$_2$O$_3$ | Percent MgO | | |
| 1 | 6.2 | 40.0 | ‑‑‑‑‑ | 39 | 49 |
| 2 | 11.8 | 3.9 | ‑‑‑‑‑ | 40 | 78 |
| 3 | 7.5 | 0.5 | 0.6 | 40 | 78 |

* Remainder of catalyst was silica.

EXAMPLE 3

Propylene dimerisation in continuous operation using fixed-bed catalyst

A precipitate was formed by adding aqueous ammonia to aqueous nitric acid, nickel nitrate, magnesium nitrate, sodium aluminate and sodium silicate until the pH was 8.5. The precipitate was washed with water by reslurrying, dried at 110° C. and finally calcined in air at 500°. The nickel, magnesia, alumina and sodium contents were 8.0%, 0.6%, 0.5% and 0.03% respectively. The surface area was 480 m.$^2$/g. and the pore volume 0.75 cc./g.

The catalyst was formed into ⅛" extrusions and 346 g. of the extrusions were charged to a tubular reactor. The catalyst was activated by heating in a stream of dry air at 500° for 3 hours and then cooled to room temperature in a stream of nitrogen. Liquid propylene was passed over the bed at 40° C. and 400 p.s.i.g. at a rate of 0.7 g./g. catalyst/hour. The propylene conversion was 82% and remained unchanged for the duration of the run (60 hours). The yield of hexenes was 74%. The proportion of linear and monobranched isomers was 93%.

The catalyst was then used for further work on both propylene dimerisation and propylene-butenes codimerisation. During this further work it was regenerated four times. Regeneration consisted of purging with a stream of nitrogen, followed by heating to 150° in a stream of nitrogen. Next the nitrogen was replaced by nitrogen containing 1% oxygen and the temperature was raised to 500°. The oxygen concentration was then gradually raised to 20%, and the heating continued at 500° for 3 hours in a stream of dry air. The temperature was reduced to ambient in a stream of nitrogen. Then a further propylene dimerisation run was carried out under the conditions of the first run. The conversion and dimer yield were as observed with the new catalyst, viz. 82% and 74% respectively.

EXAMPLE 4

Propylene dimerisation in continuous operation using catalyst slurry

A catalyst was prepared in the manner of the last example, except that neutralization was to pH8 and the precipitate was washed with water at 80° on a rotary filter. Its Ni, MgO, Al$_2$O$_3$ and Na contents were 10.9%, 0.95%, 1.8% and 0.17% respectively. Its surface area was 570 m.$^2$/g. and its pore volume 0.55 cc./g.

The catalyst (19 g.) in the form of a powder (100–120 mesh B.S.S.) was calcined in a stream of dry air at 500° for 14 hours, cooled and introduced under nitrogen into a 2-litre reaction vessel equipped with a propylene inlet, a stirrer and a wide-bore vertical exit tube. The exit tube was attached to the top of the reaction vessel, and permitted the removal of the organic fluid, while enabling the suspended catalyst powder to return to the reaction by sedimentation.

Dry liquid propylene (500 ml./hour) was fed to the reactor at 400 p.s.i.g. The reaction temperature was held at 55° C. After steady conditions had been established, analysis of the effluent from the reactor showed that 51% of the propylene fed had been converted, and that the yield of dimer on propylene converted was 80%. The dimer consisted of 67% 2-methyl pentenes, 26% n-hexenes and 7% dimethyl butenes. After a further 60 hours the run was terminated. During the period of the run the propylene conversion and yield remained unchanged at 51% and 80% respectively.

EXAMPLE 5

Codimerisation of propylene and isobutene using slurried catalysts in batch equipment In each of the runs reported below the catalyst in the form of powder was activated by heating in a stream of dry air at 500±20° C. for at least 4 hours. For each codimerisation run, 2.5±0.2 g. of the catalyst was used. The runs were carried out in a 250 ml. autoclave using a liquid olefine mixture (53±1% propylene, 110 g.) at autogenous pressure. The reactions were carried out at 60° C. Unless otherwise stated these catalysts were made by precipitation from an aqueous solution containing sodium silicate, nickel nitrate, sodium aluminate, magnesium nitrate and nitric acid. The precipitant was aqueous ammonium carbonate. The sodium content was reduced to the desired level by reslurrying and washing with water or ammonium nitrate solution.

Their proportions of linear and monobranched isomers were, respectively, 93%, 55% and 9%.

| Run No. | Composition of catalyst percent by w./w. | | | | Duration of dimerisation hours | Percent olefine conversion | Percent C₆–C₈ olefine yield | Composition of C₆–C₈ product (by wt.) | | | Notes on catalyst |
|---|---|---|---|---|---|---|---|---|---|---|---|
| | NiO₂ | Al₂O₃ | MgO | Na₂O₃ | | | | Percent C₆ | Percent C₇ | Percent C₈ | |
| 1 | 8.0 | 1.7 | Nil | 0.16 | 1 | 35 | 82 | 61 | 14 | 25 | (¹) |
| 2 | 7.7 | 4.6 | Nil | 0.14 | 0.22 | 41 | 71 | 48 | 9 | 43 | |
| 3 | 7.9 | 4.5 | Nil | 0.49 | 0.33 | 38 | 72 | 59 | 15 | 26 | |
| 4 | 10.4 | 4.4 | Nil | 0.50 | 1 | 33 | 75 | 59 | 14 | 27 | (²) |
| 5 | 10.4 | 4.4 | Nil | 0.77 | 2 | 31 | 80 | 58 | 14 | 28 | (³) |
| 6 | 7.8 | 5.6 | Nil | 0.25 | 0.35 | 54 | 63 | 40 | 6 | 54 | (⁴) |
| 7 | 6.8 | 8.3 | Nil | 0.27 | 0.5 | 58 | 39 | 44 | 14 | 42 | |
| 8 | 7.7 | 3.0 | Nil | 0.37 | 1 | 37 | 80 | 49 | 11 | 40 | |
| 9 | 7.7 | 3.2 | Nil | 0.15 | 1 | 59 | 71 | 49 | 9 | 42 | |
| 10 | 7.1 | 0.40 | 1.4 | 0.5 | 2 | 40 | 80 | 68 | 16 | 16 | (⁵) |
| 11 | 6.9 | 0.40 | 1.1 | 0.12 | 1 | 43 | 78 | 53 | 11 | 36 | (⁶) |
| 12 | 11.0 | 0.8 | 4.2 | 0.4 | 16 | 24 | 80 | 73 | 16 | 11 | (⁷) |
| 13 | 11.9 | 0.9 | 5.5 | ≯0.04 | 0.5 | 28 | 81 | 51 | 11 | 38 | (⁸) |
| 14 | 10.0 | 1.0 | 2.2 | 0.3 | 2 | 35 | 79 | 64 | 19 | 17 | (⁹) |
| 15 | 3.9 | 1.9 | Nil | 0.02 | 2 | 36 | 80 | 26 | 7 | 67 | |
| 16 | 4.0 | 3.3 | Nil | 0.02 | 0.5 | 35 | 76 | 30 | 7 | 63 | (¹⁰) |
| 17 | 4.0 | 7.9 | Nil | 0.02 | 0.33 | 53 | 58 | 28 | 11 | 61 | |
| 18 | 7.0 | 3.2 | Nil | 0.015 | 0.5 | 34 | 70 | 10 | 8 | 82 | (¹¹) |
| 19 | 2.2 | 1.3 | 1.4 | 0.16 | 16 | 58 | 82 | 47 | 9 | 44 | (¹²) |
| 20 | 9.7 | 1.8 | 1.74 | 0.19 | 1 | 28 | 85 | 58 | 11 | 31 | |
| 21 | 11.2 | 0.1 | Nil | 0.01 | 16 | 44 | 87 | 69 | 21 | 10 | |
| 22 | 7.3 | 0.4 | Nil | 0.04 | 2 | 29 | 80 | 3 | 9 | 88 | (¹³) |

¹ Precipitant was aqueous sodium carbonate.
² Precipitant was aqueous sodium carbonte.
³ Precipitant was aqueous sodium carbonate.
⁴ Precipitant was aqueous ammonia.
⁵ Precipitant was aqueous ammoniacal ammonium carbonate.
⁶ Precipitant was aqueous ammoniacal ammonium carbonate.
⁷ Precipitant was aqueous ammonia.
⁸ Precipitant was aqueous ammonia. Sodium content of the gel dried at 130° C. reduced from 0.4 to 0.04% by washing.
⁹ Precipitant was aqueous sodium carbonate.
¹⁰ These catalysts were made by precipitating a silica-alumina gel, reducing its sodium content by ion-exchange, and then impregnating the undried gel with aqueous nickel nitrate.
¹¹ This catalyst was ade by impregnating a commercial silica gel with aqueous nickel and aluminum nitrates.
¹² Catalyst dried before washing.
¹³ Catalyst made by impregnating a commercial silica gel with aqueous nickel sulphate and aluminum nitrate.

Runs 2, 3, 4 and 5 are with closely similar catalysts, except that the alkali level progressively increases, until in run 5 it is above the preferred level. Activity is seen to decrease with increasing alkali, particularly towards isobutene.

Runs 8, 9, 6 and 7 form a similar group. Here the $Al_2O_3$ content progressively increases and the yield is seen to fall.

Runs 10, 11, 12 and 13 are with catalysts containing some MgO. The catalysts are mainly different in regard to their relative proportions of alumina and alkali: the activity towards isobutene and overall activity is seen to be relatively greater at lower alkali contents.

Runs 15 to 17 are with catalysts whose sodium content is below the preferred range: their activity towards isobutene relative to propylene is undesirably high. It can also be seen that the yield decreases as the alumina content increases, although the activity increases.

Run 18 shows the effect of very low alkali content on the relative reactivities of isobutene and propylene.

Runs 19 and 20 show the effect of nickel oxide content on catalyst activity. Yields are good in both cases.

Run 21 shows the results obtained with a catalyst containing a minimum proportion of alumina and a very small proportion of alkali.

Run 22, which involves an impregnated catalyst, is seen to result in a good yield of products but the relative reactivities of propylene and isobutene are very much out of balance. Coprecipitated catalysts are greatly preferred for codimerisations.

EXAMPLE 6

Codimerisation of propylene, n-butenes and isobutene (A) Continuous fixed bed operation.—(i) The catalyst and equipment of Example 3 was used to codimerise a mixture of propylene (50%), n-butenes (25%) and isobutenes (25%). The feedrate was 1.0 g. of hydrocarbon per g. of catalyst per hour. The reaction temperature was 35° C. and the pressure 550 p.s.i.g. The olefine conversion was initially 53% and the yield of $C_6$–$C_8$ olefines was 73%. The weight composition of the $C_6$–$C_8$ olefine fraction was 57% hexenes, 29% heptenes and 14% octenes.

After 90 hours the total conversion had fallen to 44% and the $C_6$–$C_8$ yield had risen to 78% (60% hexenes, 28% heptenes and 12% octenes). The proportions of linear and monobranched isomers were unchanged.

(ii) Another portion of the catalyst used in Example 4 was fabricated into ⅛″ pellets. These pellets were loaded into the equipment used in Example 3, and activated in the manner of that example.

A run was then carried out as in (i) above, except that the feed consisted of propylene (39%), n-butenes (27%), isobutene (22%), and $C_3$ and $C_4$ paraffins (12%). The temperature was 85°, the pressure 550 p.s.i.g. and the feed rate was 3.6 g./g. catalyst/hour. The olefine conversion was 43% and the $C_6$–$C_8$ olefine yield was 73%. The proportions of $C_6$, $C_7$ and $C_8$ olefines in the $C_6$–$C_8$ fractions were 37%, 44% and 19% respectively. Of these olefins the proportions of linear and monobranched isomers were 93%, 66% and 23% respectively.

(B) Continuous slurry operation.—(i) For this run the catalyst and equipment were as in Example 4. The weight of catalyst used was 38.5 g., and the reaction conditions were 55° C. and 400 p.s.i.g., using 500 mls. per hour of a feed consisting of, by weight:

|  | Percent |
|---|---|
| Propylene | 30 |
| Butene-2 | 21.5 |
| Isobutene | 27 |
| Butene-1 | 5.5 |
| $C_3$ and $C_4$ paraffins | 16 |

After 10 hours, analysis of the reactor effluent showed that 36% of the olefine was undergoing conversion, and the yield of $C_6$–$C_8$ olefine was 81%. Of the $C_6$–$C_8$ product, 48% was hexenes, 36% heptenes and 16% was octenes, all expressed by weight.

During the next 140 hours the olefine conversion fell linearly with time to 22% and the $C_6$–$C_8$ olefine yield increased to 84% (38% hexenes, 40% heptenes and 22% octenes).

Throughout the run 93% of the hexenes produced were linear or monobranched, while the proportions of linear and monobranched heptenes and octenes were 58% and 14% respectively.

(ii) A NiO/SiO$_2$/Al$_2$O$_3$/MgO/Na$_2$O catalyst was prepared by coprecipitation using aqueous ammonium carbonate as precipitant. A portion was dried at 110° and calcined at 500°: its Ni, Al$_2$O$_3$, MgO and Na contents were 11.4%, 2.3%, 2.0% and 0.1% respectively. Since the Na level was lower than preferred according to this invention for codimerisation involving isobutene, a batch of the dried (uncalcined) powder was impregnated with dilute aqueous sodium nitrate so that after further drying and calcination the Na content was 0.27%.

This catalyst (19.3 g.) was calcined at 575° for 16 hours and used in the equipment of Example 3 to codimerise a feed consisting of (by weight):

| | Percent |
|---|---|
| Propylene | 31.5 |
| Isobutene | 28.5 |
| Butene-2 | 17.5 |
| Butene-1 | 2.5 |
| Paraffins (C$_3$ and C$_4$) | 20 |

The rate of feed of liquid monomer was 250 mls. per hour, the reaction temperature was 55° and the pressure 400 p.s.i.g.

After an initial period, during which steady running conditions were established, analysis of the reactor effluent showed the olefine monomer conversion to be 30%. After a further 90 hours the conversion had dropped to 25%. During the whole of this period the yield of C$_6$–C$_8$ olefines was 84%. The distribution of hexenes, heptenes and octenes in the C$_6$–C$_8$ product changed in the following way,

| C$_3$–C$_4$ conversion | 30% | 25% |
|---|---|---|
| Hexenes | 46 | 44 |
| Heptenes | 40 | 43 |
| Octenes | 14 | 14 |

Throughout the run 93% of the hexenes produced were linear or monobranched, while the proportions of linear and monobranched heptenes and octenes were 54% and 17% respectively.

We claim:
1. A process for codimerizing which comprises contacting a mixture of isobutene with at least one olefine selected from the group consisting of propylene, butene-1, and butene-2 with a calcined nickel oxide-silica-alumina catalyst under conditions such that a liquid phase is maintained, the catalyst being derived from jointly coprecipitated nickel, silicon and aluminum oxidic species, the content of nickel oxide in the catalyst being from 2 to 12% by weight calculated as nickel metal, the content of alumina in the catalyst being from 0.4 to 5% by weight and, the catalyst containing from 0.05 to 0.8% by weight of alkali metal oxide (calculated as metal), the balance of the catalyst being essentially silica or silica together with up to 5% by weight of the catalyst of coprecipitated magnesium oxide.

2. A process as claimed in claim 1 wherein the catalyst contains from 6 to 12% by weight of nickel as nickel oxide, up to 2% by weight alumina, and up to 0.2% by weight of alkali metal oxide (calculated as the metal).

3. A process as claimed in claim 1 wherein the catalyst contains from 6 to 12% by weight of nickel as nickel oxide, from 2–5% by weight of alumina, and from 0.2 to 0.5% by weight of alkali metal oxide (calculated as the metal).

References Cited

UNITED STATES PATENTS

| 2,606,940 | 8/1952 | Bailey et al. | 260—683.15 |
|---|---|---|---|
| 2,794,842 | 6/1957 | Hogan et al. | 260—683.15 |
| 2,828,347 | 3/1958 | Hogan et al. | 260—683.15 |
| 2,881,233 | 4/1959 | Clark | 260—683.15 |
| 2,921,971 | 1/1960 | Holm et al. | 260—683.15 |
| 3,113,166 | 12/1963 | Weesner | 260—683.15 |
| 3,335,199 | 8/1967 | Griffin et al. | 260—683.15 |

PAUL M. COUGHLAN, Jr., Primary Examiner

U.S. Cl. X.R.

252—455